INVENTOR.
John P. Woods.
Edwin B. Neitzel.
Tom Prickett Jr.
ATTORNEY.

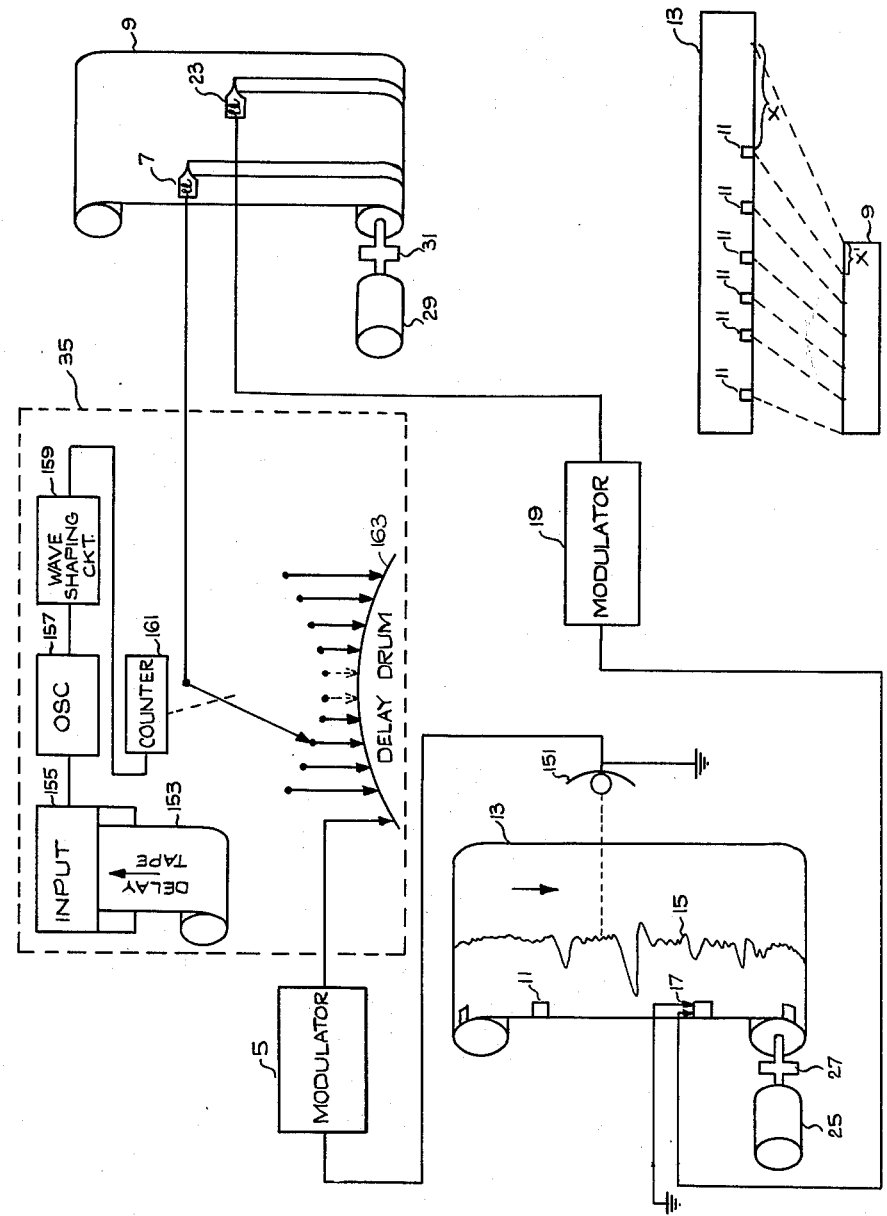

3,185,994
LOG TRANSCRIBING AND SCALE CHANGING METHOD AND APPARATUS

John P. Woods and Edwin B. Neitzel, Dallas, and Tom Prickett, Jr., Richardson, Tex., assignors to The Atlantic Refining Company, Philadelphia, Pa., a corporation of Pennsylvania
Filed Oct. 20, 1960, Ser. No. 63,750
20 Claims. (Cl. 346—1)

The present invention relates to improved methods and apparatus for transferring a function from one record medium to a second record medium. More particularly, the present invention relates to improved methods and apparatus for recording a previously recorded visible function on a second medium and modifying the original scale of the function to a predetermined scale. In a still more particular aspect, the present invention relates to improved methods and apparatus for transferring and changing a visibly recorded signal of a particular scale to a frequency modulated signal recorded at a predetermined scale of magnetic tape.

The problem of transferring intelligence recorded in visible form on a medium to a second medium with or without scale changes is confronted in many fields of endeavor. For instance, in various types of testing and metering operations it is conventional to record the output of the particular test or metering equipment by oscillograph or other direct reading recorders. To process or operate upon this data with modern-day computers, it is usually necessary to transfer the oscillograph records or other types of records to magnetic tape. Due to differences in record transport speeds, observing speeds, recording speeds, etc., it is sometimes necessary to change the scale of the originally recorded records to a new scale, requiring either linear or nonlinear scale conversion.

The oil industry is similarly faced with the problem of transferring information previously recorded on film or of transferring information previously recorded on film or paper to magnetic tape. The problem has become particularly acute with the advent of synthetic seismograms and the increased emphasis on correlation of various well logs, seismic field records, or well logs and field records. In addition, the increased use of cross section plotters and seismic computers has also increased the importance of transferring previously recorded records to magnetic tape since these devices usually operate on magnetic records instead of film or visibly recorded records.

Prior to 1954, most seismograms were recorded on film or on paper, and even today, most well logs are recorded in that manner. As a result, there is an obvious need for an efficient, accurate method of transferring to magnetic tape the vast amount of data stored on well logs and old seismograms.

The industry's growing reliance on automatic data processing mentioned above, as well as the growing tendency to re-examine and correlate old records and logs in an effort to find previously hidden producing sands in explored areas, has also produced a need for a simple, inexpensive, and flexible means of changing the scale of an originally recorded signal to a desired predetermined scale. This operation may require either a linear or nonlinear change. For instance, if a seismogram is to be correlated with a well log, the scale of the seismogram or the log must be changed since the physical length of the log is many times the physical length of the seismogram, and since the log is plotted versus depth and the seismogram is plotted versus time. If a log of a directionally-drilled well is to be correlated with a vertically-drilled well, the scale must be changed to the vertical depth. When a synthetic seismogram is to be constructed from a continuous velocity log or other log, the normal procedure is to change the scale of the continuous velocity log to two-way travel time. Therefore, it is obvious from the examples mentioned above that in most transcribing operations, it is necessary to make appropriate scale changes when the original information is being transferred to magnetic tape.

To the best of applicants' knowledge, there is no method or apparatus presently available that satisfactorily transfers a visibly recorded function to magnetic tape with the necessary scale changes. Photographic devices are available for copying records and introducing scale changes by distorting the record. Various types of hand-operated devices are available for following oscillographic recordings and changing same to direct reading visible records such as shown in United States Patent 2,866,596. Specially designed devices are available such as shown in United States Patent 2,638,671 for transforming a drilling time base log with variable footage to a log showing constant footage plotted versus variable time.

However, all of the devices are unduly large, complicated, expensive, and/or slow. A simple, portable device capable of making a linear or nonlinear scale change of the desired amount during the process of accurately transferring a visible recorded signal to magnetic tape is not presently available to industry.

Accordingly, it is the object of the present invention to provide an improved and versatile method and apparatus for transferring a function recorded on a medium to a second medium.

Another object of the present invention is to provide improved methods and apparatus for transferring a function previously recorded on a medium to a second medium and producing any necessary predetermined scale changes during the transfer operations.

Another object of the present invention is to provide improved methods and apparatus for accurately transferring a function previously recorded as visible intelligence to a magnetic record.

Another object of the present invention is to provide improved methods and apparatus for transferring a function previously recorded as visible intelligence on a medium to a magnetic medium by utilizing a modulated carrier.

Another object of the present invention is to provide improved methods and apparatus for transferring intelligence from a previously recorded well log to a magnetic medium recorded in frequency modulated form.

Another object of the present invention is to provide improved methods and apparatus for transferring a previously recorded function to a second record medium and changing the scale of at least the ordinate or abscissa of the function to a predetermined scale while the prerecorded function is being transferred to the second medium.

Another object of the present invention is to provide improved methods and apparatus for transferring a previously recorded function to a second record medium and changing the scale of said function to a predetermined scale while said function is being recorded on said second medium.

Another object of the present invention is to provide improved methods and apparatus for transferring a previously recorded function to a second record medium and changing the scale of said function to a predetermined scale by variably advancing and/or delaying the transfer time.

Another object of the present invention is to provide improved methods and apparatus for transferring a function recorded on one medium to a second medium and changing the scale of said function to a predetermined scale by varying the speed of one record medium at predetermined intervals.

Another object of the present invention is to provide improved methods and apparatus for transferring a previously recorded function to a second medium and making a predetermined linear and/or nonlinear scale change as the function is re-recorded on a second record medium.

These and other objects and advantages of the present invention will be apparent from the following detailed description. In order to simplify this description, the invention will be described with reference to its use in transcribing well logs and seismograms onto magnetic tape. However, it is to be recognized that the invention can be used with other types of records such as will be described hereinafter.

Briefly, the over-all invention includes improved methods and apparatus for scanning previously recorded visual information, translating the information into electrical signals, modulating a carrier with the signals, making the required types of linear or nonlinear scale change if this necessary, and re-recording the information in modulated form on a magnetic tape or other desired medium. The invention makes available to the industry an inexpensive, simplified, flexible, portable, and highly accurate device for transforming previously recorded information into the desired magnetic form for computer or recorder operation.

Since the scale conversion method is unique and applicable to operations other than well log and seismic record transcription and since the novel and highly accurate transcribing method and apparatus may or may not include the scale conversion method, the two broad methods will be discussed separately.

FIGURE 6 is a drawing of a transcribing apparatus with a digital type scale corrector.

FIGURE 7 is a diagrammatic representation of a digital type scale reduction.

Transcriber

Figure 1:
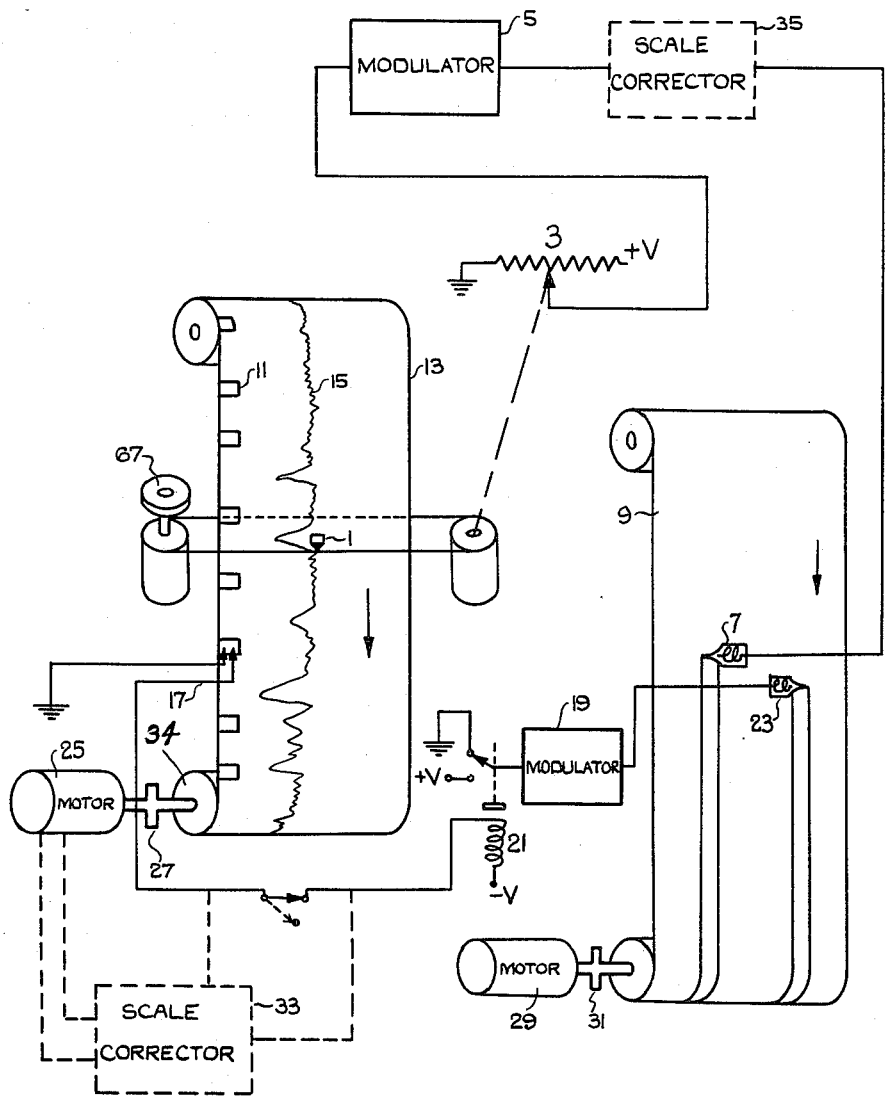
FIGURE 1 shows a record transcriber with two types of optionally used scale correctors.

The transcriber shown in FIGURE 1 includes a movable follower 1 connected through suitable means to potentiometer 3, modulator 5, and transducer head 7 positioned above record 9. Predetermined code marks 11 are positioned on chart 13 containing data 15 and read by pickup 17. Modulator 19 is activated by relay 21 when pickup 17 encounters mark 11. Transducer head 23 is driven by modulator 19. Motor 25 drives chart 13 through the desired gear ratio in gear box 27. A constant speed motor 29 drives chart 9 through a pulley and metallic belt system 31. Optional scale correctors shown in dash blocks 33 and 35 are not required in the transcribing operation, but are used to illustrate two possible positions for scale correctors. In case scale correction is desired and corrector 33 is selected, motor 25 should be a type whose speed can be accurately controlled. The scale correctors are discussed in detail hereinafter.

The purpose of the transcribing system is transfer visibly recorded function 15 to a magnetic record 9 with the highest degree of fidelity and efficiency of operation.

Since the information carried in record 13 is contained in the various amplitude variations or character changes shown in function 15, it is extremely important to transfer this intelligence to the magnetic record with a minimum of distortion and alteration. Although it is well known that FM recording provides maximum dynamic range and accuracy of amplitude reproduction, in the past, other types of recording have been used because it was thought FM was not feasible in the transcription of records such as described herein. Applicants' invention unexpectedly overcomes prior limitations to be described hereinafter and provides a novel method and equipment for using FM recording to transcribe old recorded information. It should be noted at this point that although frequency modulation is most desired since it obtains maximum dynamic range and maximum accuracy of amplitude reproduction, other types of recording can be used by applicants' device.

By utilizing the novel approach of frequency modulation in this type of operation, various problems peculiar to FM recording must be overcome. Since in most cases the original record to be transcribed on tape will be scanned at lower speeds than conventional playout speeds of magnetic tape, it is necessary to utilize a novel low frequency modulator that is suitable for various scanning and transcribing speeds encountered. The requirement for very constant low velocity rates of traverse are met by novel use of variable gear ratios, stainless steel belts, and drive motors, all of which will be described in more detail hereinafter. The metallic steel belt referred to above is covered in copending application 768,673, filed October 21, 1958, now Patent No. 3,126,626, by John P. Woods and Henry R. Barta and owned by a common assignee.

The most basic method of transferring information recorded in visible analog form on one medium to a second medium comprises the steps of scanning the visible information, translating the originally recorded information into electrical signals, modulating a carrier with the electrical signals, and re-recording the modulated carrier on a second medium.

Let us now consider the preferred embodiment of the transcriber and then consider in detail the operation thereof.

The preferred embodiment employs a hand-operated scanning device such as shown in FIGURE 1. By manually positioning pointer 1 over data 15 as chart 13 is driven by motor 25, potentiometer 3 is adjusted to operate modulator 5. Since the preferred embodiment is being described, modulators 5 and 19 are FM modulators. These and other variations used in the preferred embodiment will be described in detail hereinafter.

Figure 2:
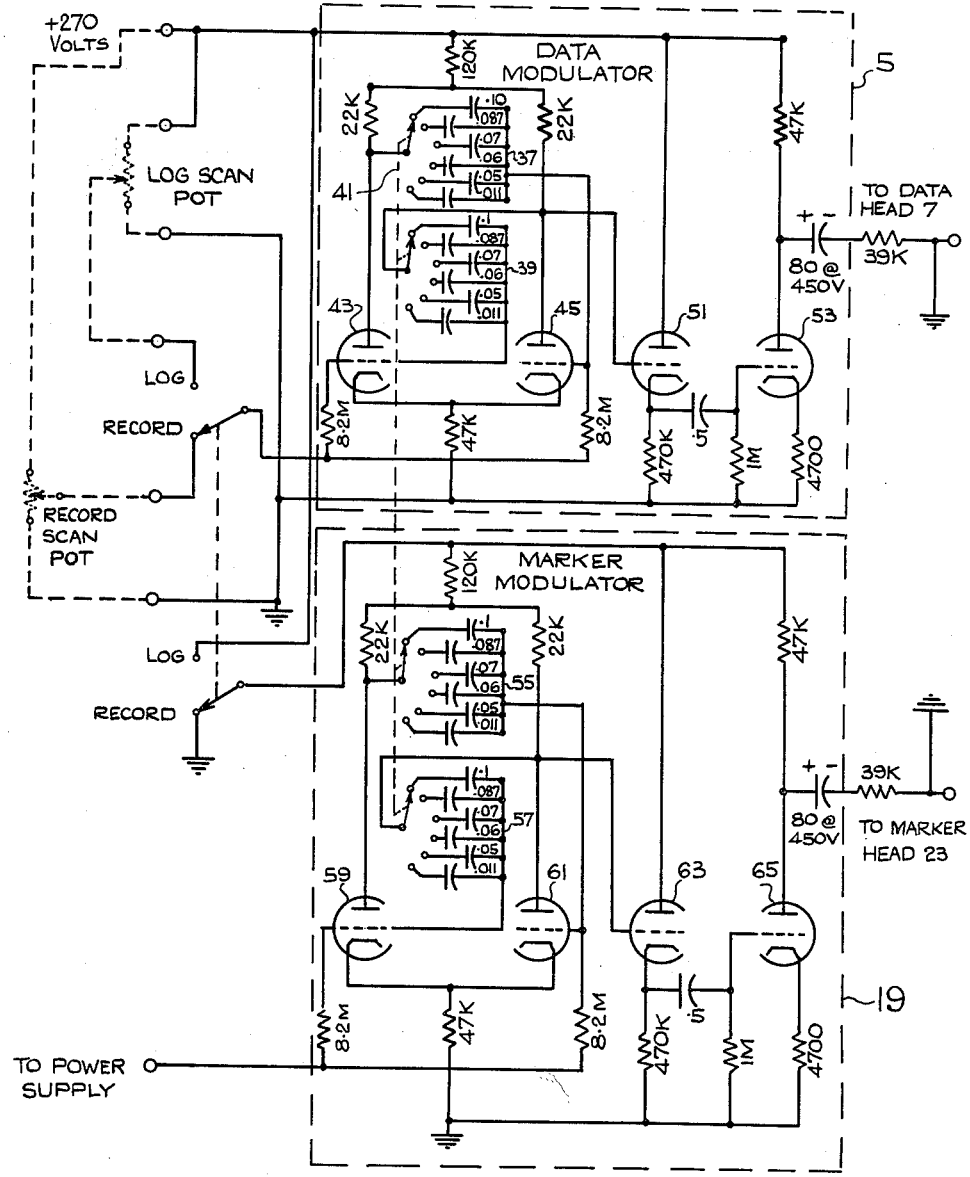
FIGURE 2 is a circuit diagram of an improved low frequency modulator with a variable frequency range.

FIGURE 2 shows two novel adjustable range, low frequency modulators that may be used in the preferred embodiment. The FM modulator shown in block 5, FIGURE 2, is designed to record at a reduced scanning speed and contains an adjustable frequency range. Since the scanning operation is reduced in speed, the recording operation must also be reduced in speed proportionately. For instance, assuming that normal magnetic tape playback speed is 7½ inches of tape per second and the normal center frequency of the FM modulator is 2,500 cycles per second, then with zero signal, 2,500 cycles are recorded on 7½ inches of tape. Therefore, it is clear that in the recording process the FM modulator must be made to operate at frequencies compatible with the low speed of the record tape to make the information readable at normal playout speeds.

To instrument this novel recording approach, the modulators in dash blocks 5 and 19 are utilized. FM modulator 5 includes a bank of capacitors 37 and a bank of capacitors 39, each of which is connected to multicontact ganged switch 41. Banks 37 and 39 are connected to the grid of triodes 43 and 45. Rotary elements 47 and 49 of gang switch 41 are connected to the plates of triodes 43 and 45, respectively, and also to the grid of triode 51 and the plate of triode 53.

Triodes 43 and 45 together with capacitor banks 37 and 39 and associated circuitry form a multivibrator portion of the modulator circuit. Triode 53 is an amplifier, and triode 51 serves as a cathode follower to isolate the multivibrator from the amplifier 53. The FM modulator 19 is similarly composed; i.e., capacitor blanks 55 and 57 connected together by gang switch 41 form with triodes 59 and 61 a multivibrator. Triode 63 serves as a cathode follower to isolate the multivibrator from the amplifier formed by triode 65.

Let us now consider transcribing a visible record to magnetic tape utilizing the preferred embodiment of the novel transcribing method.

Briefly, the preferred method includes manually scanning visibly recorded information, translating the information into electrical signals, frequency modulating a carrier with the signals at reduced rates commensurate with the manual scan rate, and recording the modulated carrier on a second medium at reduced rates.

This type of operation as well as others to be described may be utilized for varied operations, such as transcribing oscillograph records or meter readings to tape, photographically recorded seismograms to magnetic tape, electrically recorded or photographically recorded well logs to tape or to a second visible medium in which other logs are also recorded for correlation purposes, etc. However, for ease of explanation, let us assume that it is desirable to transcribe a photographically recorded seismogram to magnetic tape where no scale change is necessary.

Before actual transcription, certain preliminary steps must be taken.

Predetermined coordinating indicia are marked on the original photographic record. The position of the indicia is determined by the type of final record to be produced and whether or not a scale change is to be made. In this case, no scale change is involved and the only requirement is to transfer timing marks on the original record to the final record. Therefore, the desired number of timing marks on the original record are marked by applying strips of burglar alarm tape, by using conductive ink, or by other means to establish the predetermined code. This code will be recorded on the magnetic record as timing marks.

Drive ratios are selected in gear box 27 and pulley and belt system 31, FIGURE 1, to establish a desired basic scanning rate and appropriate recording rate; i.e., the speeds of record 13 and tape 9. This ratio is determined by the type of scanning apparatus utilized. In this case, since record 13 will be scanned manually, the speed of record 13 and the corresponding speed of tape 9 should be reduced approximately 500 times so that the operator can properly track the data on record 13. Put in another way, the speed of tape 9 is reduced approximately 500 times from the desired normal playout speed (i.e., 7½ inches per second, 10 inches per second, etc.) to correspond to record 13's manual scan speed.

The proper range of modulator frequencies to correspond with the scaled down recording speed of magnetic tape 9 is selected by using ganged switch 41. That is, the selected modulator frequency range must record the same number of cycles per second at reduced record speed as will be played back at normal playout speed. It should be noted that the marker modulator 19 frequencies are also appropriately selected by gang switch 41.

As a matter of interest, it should be noted at this time that system 31 utilizes metallic belts and pulleys instead of gears to prevent gear noise from interfering with the FM recording.

The various speed ratios and modulator ranges mentioned above can be reduced to chart form, and thus eliminate any need for computations prior to a recording operation. This is true since there are only approximately four basic well log scales used by service companies and only a limited number of widely used magnetic record playback speeds (i.e., 7½ inches per second, 10 inches per second, etc.), and photographic record speeds. Therefore, it is a simple matter to precompute the various combinations of gear ratios and modulator settings and record in chart form for all recording eventualities.

The last preliminary step is to select the no signal condition or carrier frequency of the FM modulator. This is done by positioning pointer 1, FIGURE 1, over 15 on log 13 so it is centered in the middle of the maximum amplitude excursion.

With the preliminary steps over, actual transcription can be initiated. Seismic photographic record 13 is slowly driven under marker 1 by motor 25 operating through gear box 27 to drum 34. As data 15 moves under pointer 1, control knob 67 is manually adjusted to maintain pointer 1 on data 15. When pointer 1 is moved, potentiometer 3 is varied, producing a voltage which is used as a bias and applied to the grids of multivibrator tubes 43 and 45, FIGURE 2. The preselected capacitor 5 chosen by positioning gang switch 41 controls the frequency range of the modulators 5 and 19. The amount of bias voltage applied to the modulator tubes 43 and 45 controls the output frequency of multivibrator 5. The output of the multivibrator 5 is sent through cathode follower 51, amplifier 53 and to transducer head 7 shown in FIGURE 1, where it is recorded on tape 9.

Simultaneously with the transcription of data 15 shown in FIGURE 1, code marks 11 approach pickup 17. Prior to the passage of a code mark under pickup 17, frequency modulator 19 shown in FIGURE 2 produces a constant frequency output as selected by the setting of gang switch 41. As a code marker 11 passes under contact 17 shown in FIGURE 1, the metallic strip shorts out the contact and temporarily changes the D.C. bias applied to the grids of multivibrator tubes 59 and 61, FIGURE 2. The resulting bias produces an FM signal which passes through cathode follower 63, amplifier 65, and to transducer head 23, FIGURE 1, where it is recorded as a timing signal on tape 9.

Figure 5:
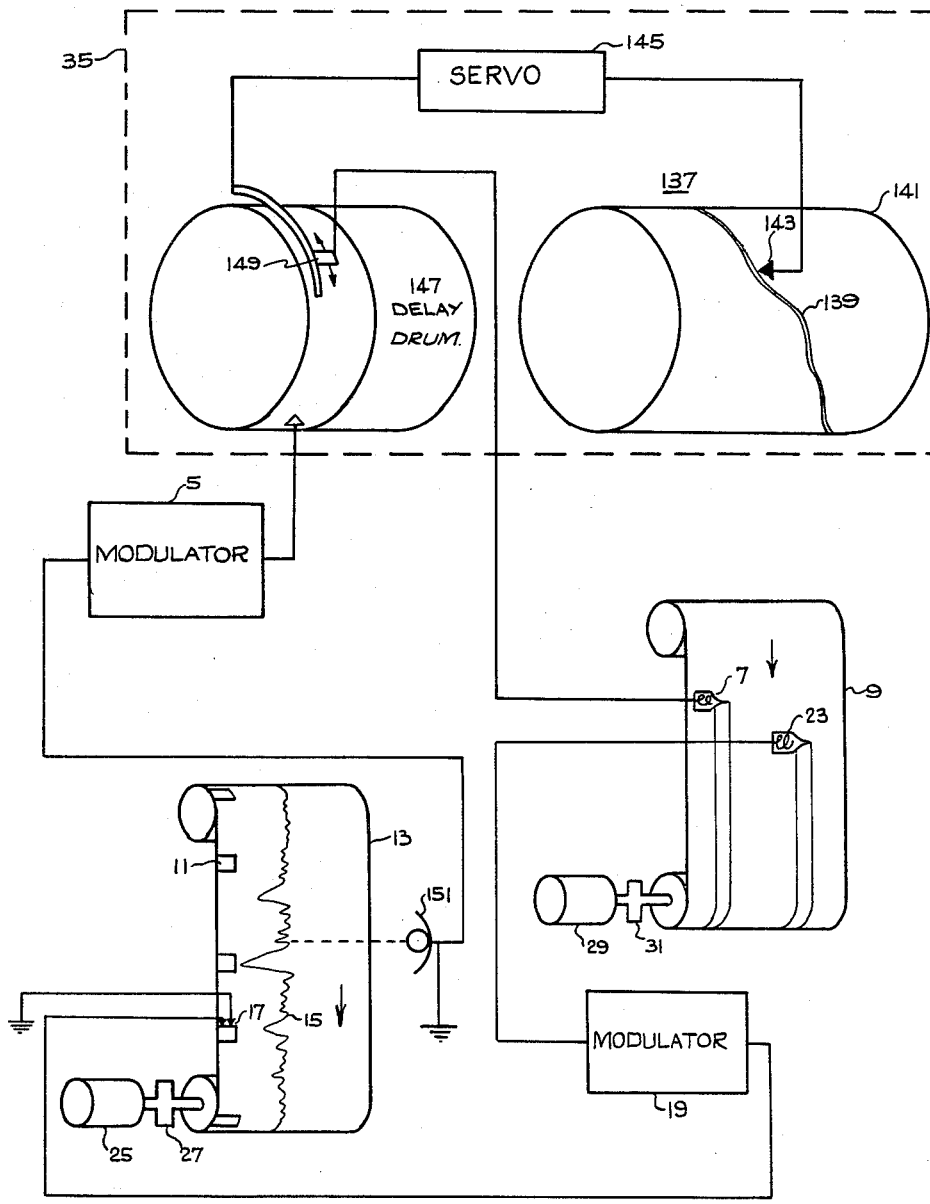
FIGURE 5 is a diagram showing a transcribing device with an analog type scale corrector.

The novel method of transcription described above can be carried out in many and varied different ways. For instance, the record to be transferred can be automatically scanned or semi-automatically scanned as desired. If it is desirable to automatically scan the data, a photoelectric cell such as shown in FIGURE 5 or other well-known automatic scanners can be utilized to read the data. If it is desirable to operate semi-automatically, a photoelectric scanner can be utilized in combination with a manual tracking means so that as the scanner reads the intersection of two crossing data lines, the manual operator can take over and maintain the data reader on the proper information. In any case, the output from such reading devices can be utilized to modulate a carrier which is recorded on magnetic tape or the like. As pointed out heretofore, if FM modulation is not desired, amplitude modulation or other suitable modulation can be practiced. Transcribing operations not requiring scale change can utilize the same drum for mounting the original record 13 and magnetic tape 9.

*Scale correction*

The basic scale correcting method can be practiced by using a variable speed drive and controller therefor, or by using a variable advance and delay and controller therefor. Suitable devices are covered in divisional application, Serial No. 291,766, filed July 1, 1963.

The purpose of the scale changing system is to provide a simplified yet accurate means to adjust the scale of originally recorded information to a predetermined scale on magnetic tape or other recording medium. An additional purpose is to provide a flexible scale changing system so that a linear-to-linear, a linear-to-nonlinear, or a nonlinear-to-linear scale change may be made during the process of transcription.

By utilizing the novel approach of operating on the information or the original or transcription record at predetermined intervals, an extremely accurate and flexible system of scale changing is produced.

The general method of scale conversion includes the steps of placing a predetermined code on the medium bearing an originally recorded function after the function has been recorded on the medium, simultaneously scanning the code and the function, re-recording the scanned function and modifying the scale of the function as dictated by the predetermined code.

The subject method is capable of two basic variations in practice. That is, the scale change can be produced by varying the speed of one record at predetermined intervals by corrector 33, FIGURE 1, or the scale change can be produced by operating on the scanned function by advancing and delaying it predetermined amounts by corrector 35. Either corrector can be used with the basic transcriber shown in FIGURE 1 and discussed heretofore; however, it should be noted that either corrector or any variation thereof can also be used with other types of transcribing systems.

Let us now describe the preferred method of scale change and the preferred apparatus for performing same.

FIGURE 1 shows the over-all combination transcriber-scale corrector. Either scale corrector 33 or 35 can be used with the transcriber. Scale corrector 33 is the preferred corrector and is arranged to vary the scan speed of record 13 at predetermined intervals marked by code 11. During each interval, the speed will be varied a predetermined amount so that the new record will have the code marks separated by equal intervals of record. It should be also understood at this time that the rate of record 9 can be varied instead of record 13; however, if FM recording is used, the modulator would have to be compensated for the speed variations.

Figure 3:
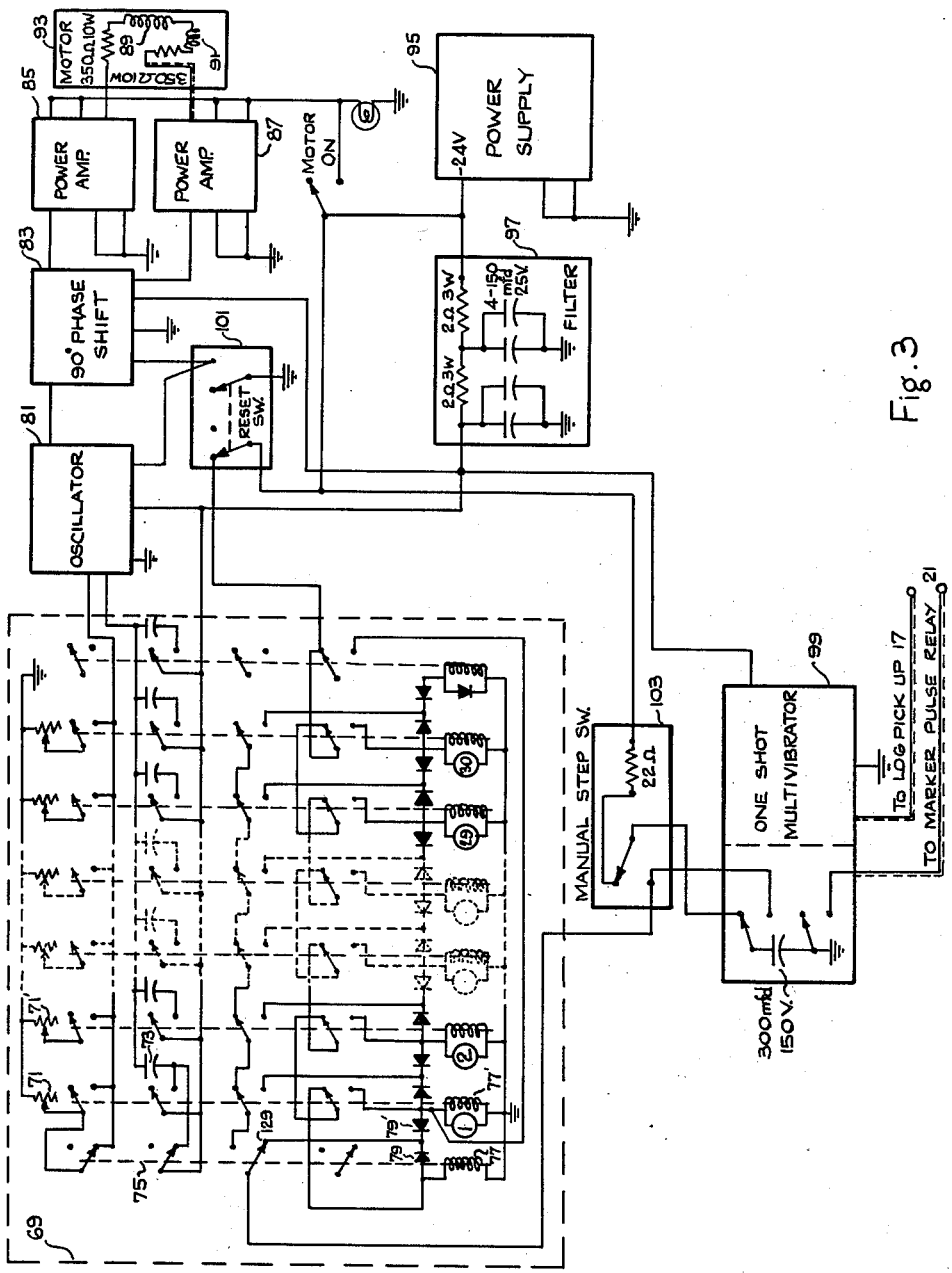
FIGURE 3 is a schematic drawing of the preferred embodiment of the scale corrector.

FIGURE 3 shows in detail the preferred embodiment of scale corrector 33 in FIGURE 1. Block 69, FIGURE 3, discloses an automatic means for controlling the speed of drive motor 25, FIGURE 1. The control means contains a bank of potentiometers 71, a bank of trim capacitors 73, a plurality of multicontact ganged switches 75 operated by relays 77, and a series of diodes 79 connected with the switches in such a way as to form a stepping matrix. The operation of same will be explained in more detail hereinafter. Block 69 is connected to oscillator 81 which in turn is connected to phase shift network 83. This network is connected to power amplifier 85 and power amplifier 87, respectively, and they in turn are connected to respective windings 89 and 91 in synchronous motor 25. Power supply 95 is connected to filter 97, which in turn is connected to oscillator 81, phase shifter 83, one-shot multivibrator 99, and control means 69. Reset switch 101 is connected to phase shifter 83, control 69, and manual step switch 103. As will be apparent after the detailed description, reset switch 101 causes matrix 69 to shift to the preoperation position whereby relay 77 is activated. Step switch 103 causes the next higher numbered relay to be operated.

Figure 4:
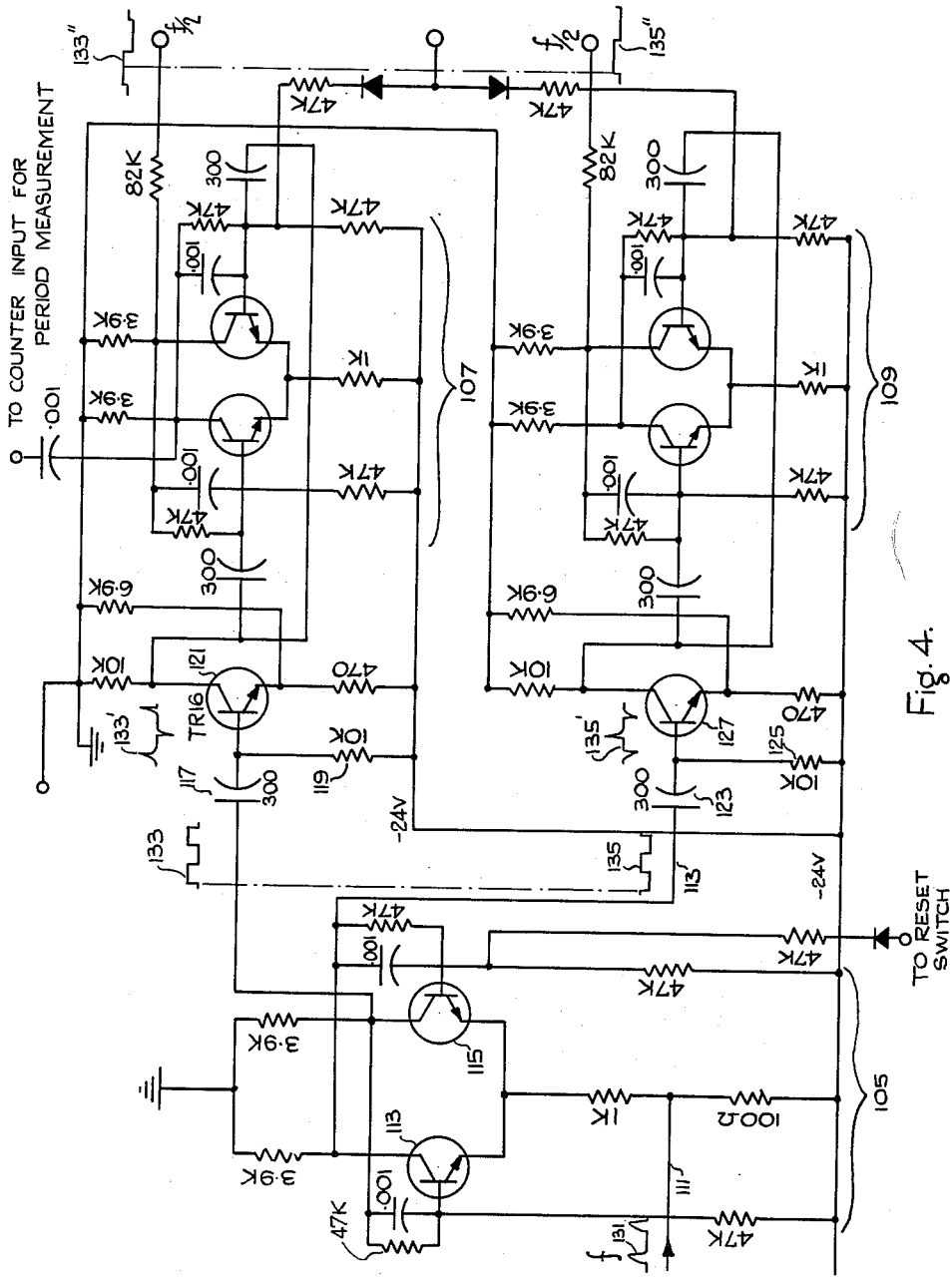
FIGURE 4 is a circuit diagram of an improved 90° phase shifting circuit.

Before considering the operation of the preferred embodiment, refer to FIGURE 4 which shows in detail a novel 90 degree phase shifting circuit designed for operation in block 83, FIGURE 3. The problem of providing voltages 90 degrees out of phase to 90 degree windings on a synchronous motor is a relatively simple operation when the input frequencies remain constant. However, when the input frequency to a phase shifting circuit is continually varied, the problem of maintaining a 90 degree phase shift becomes very difficult. The novel, simplified, and flexible phase shifting circuit shown in FIGURE 4 is adapted to meet this problem. To the best of applicants' knowledge, no presently used phase shifting circuit is capable of operating with such dependability and simplicity of circuit design.

The novel circuit as shown in FIGURE 4 includes drive flip flop 105 and driven flip flops 107 and 109. Flip flop 105 includes input circuit 111 and transistors 113 and 115. Transistor 113 is connected through differentiating circuit (capacitor 117 and resistor 119) and trigger transistor 121 to flip flop 107. Transistor 115 is connected through differentiating circuit (capacitor 123 and resistor 125) and trigger transistors 127 to flip flop 109. As will be shown in the detailed description of the operation of FIGURE 3, the phase shifting circuit shown in FIGURE 4 is capable of maintaining a 90 degree phase shift between its output voltages regardless of the input voltage frequency variations. Therefore, regardless of the output frequencies programmed by 69, synchronous motor 93 receives the required two voltages that are 90 degrees out of phase. Further reference is made to divisional application, Serial No. 291,769, filed July 1, 1963, which application specifically covers the aforementioned 90 degree phase shifting circuit.

Let us now consider the detailed operation of the preferred method and apparatus for producing a scale change. Since the preferred embodiment of the scale changing operation involves changing the scan rate of the original record at predetermined intervals, the novel operation may be described as follows.

A method of changing the scale of a function prerecorded on an original medium to a predetermined scale on a second medium while the prerecorded function is being transferred to the second medium comprising the steps of placing a predetermined speed change code on the medium bearing the prerecorded function after the function has been recorded on the medium, concurrently scanning the function and the speed code and producing outputs therefrom, and re-recording the function on the second medium at a new scale determined by the speed code output.

Let us assume for purposes of illustration that it is desirable to produce a synthetic seismogram from a particular type well log. Assuming the log is from a vertically drilled well, the scale change involved is changing the linear depth scale of the well log to a linear travel time (two-way) for the seismogram. The step of filtering the log to produce seismic frequencies, even though necessary in producing a synthetic seismogram, is not important in the scale changing operations and will not be discussed.

To better understand the over-all operation, it is necessary to discuss preliminary operations designed to set up an apparatus that is capable of practicing the novel method of scale changing. The preliminary operations can be broken down into those required to establish a desired speed change code on the original log and the preliminary operations necessary to set up a machine for transferring the original log to the magnetic record.

The preliminary operations are as follows:

Determining the position of the speed change code (in this case, two-way travel time marks). The purpose of this operation is to break the original log or record into a predetermined number of sections so that by varying the scan speed (or delay) at the start of each of these predetermined sections, the scanned information is recorded on a uniformly moving magnetic tape producing a predetermined scale change. Unless a nonlinear scale is to be recorded, the speed change code marks are recorded in equally spaced positions along the magnetic tape.

The determination of the position of the speed code can be accomplished mathematically in various ways. The most simple method is to utilize the average seismic velocities (furnished with each log of interest) and determine the depths of one tenth second intervals of two-way travel time.

Of course, any suitable equal interval can be used. The predetermined intervals are marked on the log or record by using strips of burglar alarm tape, conductive ink, or other suitable markings.

Since the preferred embodiment of the device capable of practicing the preferred method of scale change utilizes an automatic speed changing control 69, FIGURE 3, it is necessary to set in potentiometers 71, 71', etc., each of which will be sequentially connected by voltage developed from a speed code marker 11, the resistance necessary to produce a frequency change to drive the synchronous motor 93 at the next new predetermined speed. Knowing the inherent capacitive and resistive combination in oscillator 81, it is basic to determine the resistance settings required to produce the desired frequency changes required to drive synchronous motor 25 at its new predetermined speeds. The number of potentiometer settings to be made depends upon the number of code marks placed on the record. Of course, the number of potentiometers 71 is not important to the inventive concept; and if more settings are required than the number of potentiometers available, speed changing control 75 can be reprogrammed as the device switches through the original settings.

The preliminary steps of selecting the correct scanning and driving ratios, modulator range, and proper carrier frequency were disclosed in the discussion of the transcribing method. Since for purposes of illustration that transcribing method is used to record the function in this scale changing method, no further elaboration is necessary.

With the preliminary operations accomplished, log 13 bearing data 15, FIGURE 1, is moved under pointer 1. Pointer 1 is continually repositioned by control knob 67, which in turn varies bias potentiometer 3. The varying bias produced controls the output frequency of modulator 5. The FM signal is recorded by head 7 on tape 9. Simultaneously with recording the data, the initially selected speed of motor 25 drives log 13 at the selected speed. As the first speed code 11 passes under contact 17, the code shorts out the contact, actuating one-shot multivibrator 99, FIGURE 3, sending a pulse through contact 129, diode 79' to actuate relay 77' and close ganged switch 75'. Thus, each succeeding pulse from multivibrator 99 closes the next succeeding ganged switch in 69 in the same manner. With the activation of ganged switch 75', the resistance setting in potentiometer 71 and the capacitance in trimmer capacitor 73 are included in the circuit of oscillator 81. This new combination of resistance and capacitance changes the oscillator output frequency of 81 to a new predetermined value shown as frequency $f$ and wave form 131 in FIGURE 4. Phase shift circuit 83, FIGURE 3, shown in detail in FIGURE 4 receives oscillator output 131 at input 111. Flip flop 105 is actuated by pulse train 131 to produce square wave trains 133 and 135. Both 133 and 135 occur at frequency $f$; however, they are 180 degrees out of phase. The respective differentiating circuits produce waves 133' and 135', which are used to actuate trigger transistors 121 and 127, which in turn trigger flip flops 107 and 109. Output wave 133" from 107 is now 90 degrees out of phase with output 135", and the frequency of the output waves are $f/2$ or one-half the input frequency. Therefore, regardless of the oscillator or input frequency $f$, outputs 133" and 135" are 90 degrees out of phase as they are fed to their respective power amplifiers 85 and 87 in FIGURE 3.

It is evident from the explanation above that each pulse created by speed code 11, FIGURE 1, sequentially pulses control 69 in such a manner that a new predetermined frequency is fed to the synchronous motor, which in turn drives chart 13 at the new predetermined speed. Therefore, chart 13 is variably driven to introduce the desired scale change as the data is recorded on the tape driven at a constant speed.

A simplified variation to the method described above involves manual operation of the scanner and modulator as well as manual selection of the input frequencies to the synchronous motor. Although this method of operation is slower than the method discussed above, it has proven quite successful over an extended period of usage. The instrumentation of this method includes a manual tracking and modulating system as disclosed in FIGURE 1 with a different speed control system.

In operation, pickup switch 17 is connected to a signal lamp. The passage of a marker 11 under 17 flashes the lamp, at which time an operator punches a new precomputed frequency into the keyboard of a conventional signal generator connected to a synchronous motor driving chart 13.

Let us now briefly consider another embodiment of the basic scale changing method which operates on the signal by advancing or delaying it instead of varying the speed of one record. Refer now to the basic transcriber and scale corrector 35 shown in FIGURE 1. Corrector 35 is positioned to operate on the modulated signal from the scanned data. This system of scale change utilizes digital or analog operations to enter the desired scale change.

For instance, if an analog-type system is desired to make the appropriate scale changes, a variable delay such as a magnetic delay line is controlled by a function generator or other device to operate on the data read from chart 13 before it is recorded on record 9. FIGURE 5 shows one type of scale corrector capable of performing the analog method of scale correction. Scale corrector 35 shown in FIGURE 1 is included in dash block 35 on FIGURE 6. This particular embodiment includes function generator 137, which includes a curve 139 mounted on a drum 141, a curve follower 143, and servo 145. Magnetic delay drum 147 includes a magnetic head 149 arcuately movable around delay drum 141 by servo 145. Curve 139 is a plot of a correction function (delay or advance versus time) necessary to accommodate scanned data 15 to the desired scale change on record 9. For complete details of an analog device suitable for entering such a delay, see copending application 749,190, filed July 17, 1958 by John P. Woods and Clifford D. Dransfield and owned by a common assignee.

It should be understood that if data 15 is scanned manually, the previously discussed appropriate reduction in recording speed and modulator speed (if FM modulation is used) is necessary. If reduced speeds are used, it should also be understood that an appropriate increase in delay time is also necessary. If data 15 is electronically scanned, then no scale-down is required and the recording and delay system can be driven at a normal speed. Assuming that chart 13 is scanned by an electronic eye 151 in a manner known to those skilled in the art, the information so scanned is utilized to modulate modulator 5 which is recorded on delay drum 141. Predetermined advance and delay curve 139 read out by curve follower 143 operates servo 145, which in turn causes read-out head 149 to enter the appropriate head movements to stretch or compress the scanned information so the final signal recorded by magnetic head 7 on record 9 is recorded to the desired predetermined scale. In other words, curve 139 causes pickup head 149 to advance or delay the signal recorded on drum 147 amounts necessary to make the desired scale change.

FIGURE 6 shows a digital delay type scale corrector used with a transcribing apparatus such as disclosed in FIGURE 1. The scale corrector shown in dash block 35 includes delay tape 153, serially connected input circuit 155, oscillator 157, wave shaping circuit 159, and counter 161, which controls magnetic delay line 163.

In order to better understand how this device performs the scale changing operation, FIGURE 7 presents in a highly simplified fashion a log 13 and a magnetic tape 9. Code marks 11 have been placed on log 13 to indicate $\frac{1}{10}$ second two-way travel time intervals determined in a manner explained in the discussion of the speed change method above. The unequal distances between the various code marks 11 on chart 13 indicate that a nonlinear scale correction must be made if the data recorded on 13 is to be transcribed on magnetic tape 9 at equal $\frac{1}{10}$ two-way travel time intervals.

If the scale change and the final transcription operation are to be made in one operation, the method can be as follows. The speed ratios in 27 and 31, FIGURE 6, are selected in such a manner that the largest two-way travel time $x$ on record 13 is scaled down mechanically to the desired distance $x'$ on tape 9 by virtue of the speed ratios selected. The remaining increments of data 15 between code marks 11 on log 13 must now be delayed through corrector 35 appropriate amounts to equal the first increment $x'$ on tape 9. To produce the appropriate delays for each increment, a program tape or chart 153 is produced as disclosed in copending application, 790,631, filed February 2, 1959 by John P. Woods, Edwin B. Neitzel and Clifford D. Dransfield and owned by a common assignee. This program tape is produced to contain the required number of delay pulses between each code 11 to cause that increment of data 15, when played back from chart 13, to be delayed sufficiently to equal increment $x'$ when recorded on tape 9. That is, the total delay (required to stretch a particular increment of data 15 to equal $x'$) is divided by the width of a single delay pulse to give the number of delay pulses required for a particular increment of data. These delay pulses are placed on the program tape in the manner described in application 790,631 to produce the predetermined scale change.

In operation, chart 13 and tape 9 are driven at the proper speeds to change distance $x$ to $x'$ during a given time. Data 15 is read out by 151, or other suitable means, and fed through modulator 5 and delay drum 163 onto tape 9. The above-described program or delay tape 153 operates in synchronism with the movement of chart 13 and delay puses from this tape are fed through input circuit 155, oscillator 157 wave shaping circuit 159 to counter 161. Each pulse from the delay program actuates counter 161 and adds a minute incremental delay to the data scanned from tape 13 by 151. The delays added to the increment of data between each code 11 causes it to equal distance $x'$ when recorded on tape 9.

If desired, the digital delay tape correction may be varied to include the following method. Speed reduction ratios between 27 and 31 are determined as described above to cause distance $x$ on 13 to equal distance $x'$ on tape 9. Log 13 is then played out and recorded on tape 9 in a linear fashion as prescribed by the gear reduction ratio. It is obvious from observing FIGURE 8 that the smaller incremental distances between code marks 11 are recorded on tape 9 as increments less than $x'$. To adjust these distances to equal $x'$, it is necessary to play back tape 9 and enter the proper delays by the digital (or analog) operation and re-record the adjusted data on a second tape.

Although the methods and apparatus have been illustrated for operation on seismic and logging data, it is obvious that the invention is just as appropriate for other operations requiring the transcription to magnetic record and/or appropriate scale changes. Therefore, it is to be observed that although specific embodiments of the instant invention have been illustrated and described herein, various modifications and substitutions may be made which will be obvious to those skilled in the art, without departing from the scope of the present invention which is limited only by the appended claims.

We claim:

1. A method of transferring information recorded in analog form on one medium to a second medium comprising the steps of translating the originally recorded information into electrical signals, modulating a carrier with said electrical signals, making predetermined scale changes, and recording said signals on the second medium.

2. In a method as set forth in claim 1 wherein the electrical signals frequency modulate the carrier.

3. In a method as set forth in claim 1 wherein the electrical signals amplitude modulate the carrier.

4. In a method as set forth in claim 1 wherein the scale change is made as the signals are recorded on the second medium.

5. A method as set forth in claim 1 wherein the scale changes are made by varying the speed of one medium in a predetermined manner.

6. A method of transferring original information recorded in visible form on one medium to a second medium comprising the steps of translating originally recorded data into electrical signals, modulating a carrier with said electrical signals, and recording the modulated carrier on a second medium.

7. In a method as set forth in claim 6 wherein the electrical signals frequency modulate the carrier.

8. In a method as set forth in claim 6 wherein the electrical signals amplitude modulate the carrier.

9. In a method as set forth in claim 6 wherein the modulated carrier is recorded at reduced speed on the second medium.

10. In a method as set forth in claim 6 wherein predetermined coordinating indicia, placed on the first medium after the original information is recorded on said medium, is concurrently recorded with said original information on the second record.

11. A method of changing the scale of a function prerecorded on an original medium to a predetermined scale on a second medium while said prerecorded function is being transferred to said second medium comprising the steps of placing a predetermined code on one medium after the function is on the medium, concurrently scanning said code and said function and producing outputs therefrom, recording said outputs and modifying the scale of said function in accordance with said predetermined code.

12. In a method as set forth in claim 11 wherein the predetermined code determines the speed of the original record medium.

13. In a method as set forth in claim 11 wherein the predetermined code determines the speed of the second record medium.

14. In a method as set forth in claim 11 wherein the predetermined code represents a predetermined scale.

15. In a method as set forth in claim 11 wherein the code determines the frequency of periodic delays applied to the function.

16. In a method as set forth in claim 11 wherein the code determines amount of variable delay applied to the function before it is recorded on the second medium.

17. An improved record transcribing and scale correcting device, comprising: a scanning means adapted to follow a function recorded on a first record medium, a variable voltage source connected to said scanning means and adapted to produce an electrical signal which is an analog of said function, a first modulator connected to the output of said variable voltage source and adapted to produce a modulated signal from said analog signal, a recording head connected to the output of said modulator and adapted to record said modulated signal from said first modulator on a second record medium, a detector means adapted to detect scale indications recorded on said first record, a second voltage source operable in response to said detector means and adapted to produce an electrical signal representative of said scale indications, a second modulator connected to the output of said second voltage source and adapted to produce a modulated signal from said signal from said second voltage source, a second recording head connected to the output of said second modulator and adapted to record said modulated signal from said second modulator on said second recording medium and a variable speed drive motor adapted to advance one of said record mediums.

18. An apparatus in accordance with claim 17 wherein the first modulator comprises: a multivibrator, including, two like banks of capacitors coupling the stages of said multivibrator, each of said banks having a plurality of capacitors of different capacitive values, and a ganged step switch adapted to couple complementary ones of said capacitors of said banks of capacitors to said multivibrator circuit, an amplifier connected to the output of said multivibrator and a cathode follower connected between said multivibrator and said amplifier to isolate said amplifier from said multivibrator.

19. An improved record transcribing and scale correcting device, comprising: a scanning means adapted to follow a function recorded on a first record medium, a variable voltage source connected to said scanning means and adapted to produce an electrical signal which is an analog of said function, a modulator connected to the output of said variable voltage source and adapted to produce a modulated signal from said analog signal, a recording head connected to the output of said modulator and adapted to record said modulated signal from said modulator on a second record medium, a variable speed drive motor adapted to advance one of said record mediums and a programmer connected to said variable speed motor and adapted to change the speed of said motor in response to precoded speed change data.

20. An improved record transcribing and scale correcting device, comprising: a scanning means adapted to follow a function recorded on a first record medium, a variable voltage source connected to said scanning means and adapted to produce an electrical signal which is an analog of said function, a first modulator connected to the output of said variable voltage source and adapted to produce a modulated signal from said analog signal, a variable time delay means connected to the output of said first modulator and adapted to change the real time of said modulated signal by predetermined amounts, a first recording head connected to the output of said delay means and adapted to record a said delayed signal on a second recording medium, a detector means adapted to detect scale indications recorded on said first record medium and produce an electrical signal representative of said scale indications, a second modulator connected to the output of said detector means and adapted to produce a modulated signal from said signal from said detector means and a second recording head connected to the output of said second modulator and adapted to record the modulated signal on said second record medium.

References Cited by the Examiner
UNITED STATES PATENTS

| | | | |
|---|---|---|---|
| 1,838,389 | 12/31 | Goldberg | 346—1 |
| 2,578,133 | 12/51 | Hawkins | 346—33 |
| 2,796,317 | 6/57 | Valenti et al. | 346—136 |
| 2,885,574 | 5/59 | Roesch | 307—88 |
| 2,912,673 | 11/59 | Groenendyke. | |
| 2,924,810 | 2/60 | Horeth | 346—15 |
| 2,944,166 | 7/60 | De Miranda | 307—88.5 |
| 2,945,977 | 7/60 | Kennedy | 318—341 |
| 2,951,736 | 9/60 | Black | 346—1 |
| 2,975,399 | 3/61 | Burns | 340—15.5 |
| 3,014,650 | 12/61 | Skeltor et al. | |

LEYLAND M. MARTIN, *Primary Examiner.*

NEWTON N. LOVEWELL, LEO SMILOW, *Examiners.*

UNITED STATES PATENT OFFICE
CERTIFICATE OF CORRECTION

Patent No. 3,185,994

May 25, 1965

John P. Woods et al.

It is hereby certified that error appears in the above numbered patent requiring correction and that the said Letters Patent should read as corrected below.

Colum 3, line 19, after "this" insert -- is --; line 65, after "is" insert -- to --; column 4, line 74, for "blanks" read -- banks --; column 6, line 49, for "change" read -- changes --; column 7, line 73, for "transistors" read -- transistor --; column 8, line 3, for "variations" read -- variation --; column 11, line 25, for "puses" read -- pulses --; line 32, for "tape" read -- type --.

Signed and sealed this 19th day of October 1965.

(SEAL)
Attest:

ERNEST W. SWIDER
Attesting Officer

EDWARD J. BRENNER
Commissioner of Patents